(No Model.)
J. W. CARPENTER.
REVOLVING SELF BASTING OVEN.
No. 427,671. Patented May 13, 1890.
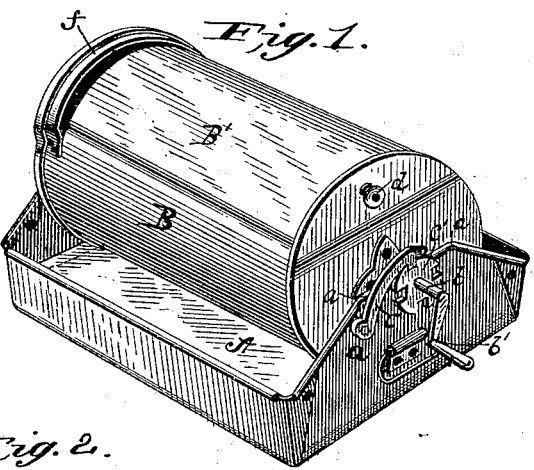
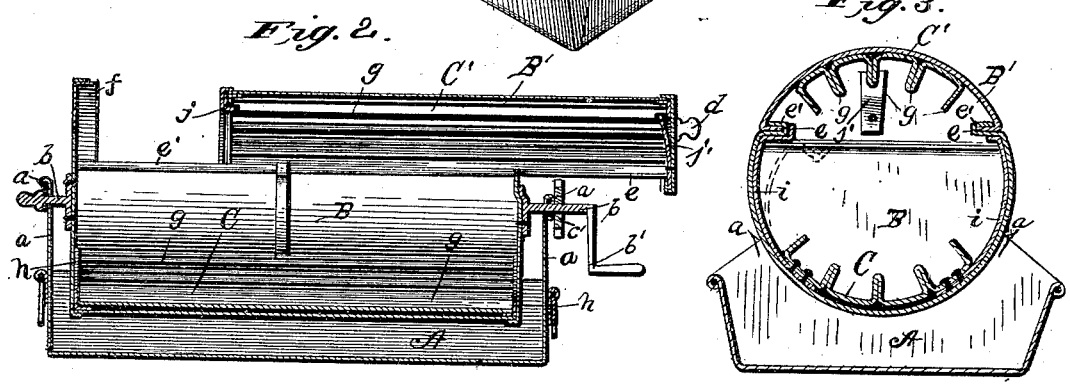
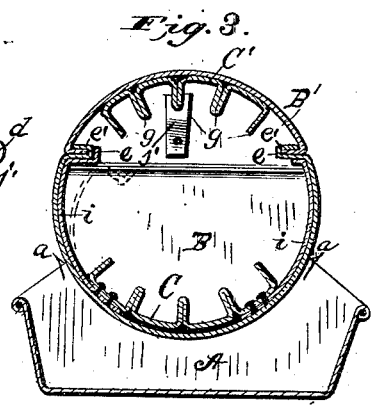
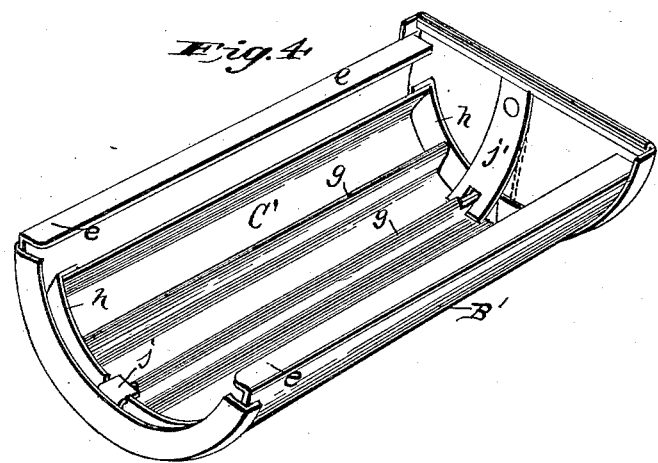
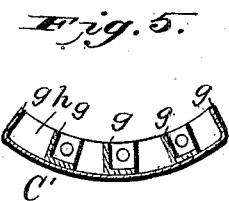

UNITED STATES PATENT OFFICE.

JAMES W. CARPENTER, OF DAYTON, OHIO.

REVOLVING SELF-BASTING OVEN.

SPECIFICATION forming part of Letters Patent No. 427,671, dated May 13, 1890.

Application filed November 27, 1888. Serial No. 291,969. (No model.)

*To all whom it may concern:*

Be it known that I, JAMES W. CARPENTER, a citizen of the United States, residing at Dayton, in the county of Montgomery and State of Ohio, have invented certain new and useful Improvements in Revolving Self - Basting Ovens, of which the following is a specification, reference being had therein to the accompanying drawings, in which—

Figure 1 represents a perspective view of my improved self-basting roasting-oven; Fig. 2, a longitudinal sectional view of the same; Fig. 3, a transverse sectional view; Fig. 4, a detail perspective view of the upper sliding section or top of the revoluble oven, and Fig. 5 a detail transverse sectional view of one of the basters.

This invention has relation to certain new and useful improvements upon that class of self-basting revoluble roasting and baking ovens described and claimed in an application filed by me on the 5th day of November, (Serial No. 289,954,) 1888, in which an oven composed of two hinged sections is revolubly mounted upon or supported upon a pan, the oven being provided on its interior with permanent basting ribs or projections which automatically baste the roast whenever the oven is revolved, as will be more fully hereinafter described.

A drawback or difficulty with the oven shown in my former application was that almost every time it was desired to examine the roast to ascertain the progress of the roasting process the oven had to be removed from the stove-oven, as very few stove-ovens are spacious enough to permit the upper hinged section to be thrown back far enough for that purpose.

Another feature of disadvantage in my former oven lies in the fact that the basters are attached permanently to the interior of the oven, and for that reason cannot be readily cleaned when desired.

The main object of this invention is to remedy these defects in my former oven; and it consists, essentially, in providing the revoluble oven or casing with a sliding top or upper section and to attach the interior of both sections removable basters, as will be more fully hereinafter set forth.

In the accompanying drawings, the letter A designates a pan or vessel having its upturned ends extended up, as at $a$, a short distance to form bearings for the revoluble oven B. The oven is provided upon its ends with short horizontal shafts or trunnions $b\,b$, which rest in suitable notches or depressions in the extended ends $a$, one of these pintles $b$ being extended to form a crank $b'$. Pivoted on one end of the pan is a pawl or catch $c$, which is adapted to engage a notched or recessed wheel $c'$, secured upon one of the shafts $b$, and hold the revoluble closed oven B in any desired position and prevent the same tipping or tilting in either direction. The oven B may be any shape in cross-section; but I prefer to construct it cylindrical. The oven is provided with a sliding section B', which may be drawn back, as shown in Fig. 2, to permit an examination of the contents of the oven B without removing the oven from its bearings or the entire apparatus from the stove-oven, as was heretofore necessary. This sliding section is provided at one end with a knob or handle $d$, by which it may be operated. The inwardly-projecting longitudinal angular edge $e\,e$ of the sliding section B' works in guiding-grooves $e'$, formed by turning or bending the longitudinal edges of the main section B, and its rear end, when the section is closed, rests under an overhanging flange $f$, formed on the end of the casing or oven.

Secured upon the interior of the oven B and the sliding section B' are plates C C', provided with the longitudinal ribs or projections $g$, which latter serve to collect the juices of the meat and distribute the same over the roast when the oven is revolved, thus serving to automatically baste the same with its own juices. These plates are preferably provided with flanges $h$ at their ends, and the basters $g$ may be either formed by longitudinally corrugating the plates, as shown in Figs. 3 and 4, or they may be formed separate and attached thereto, as shown in Fig. 5.

The plate C is removably held in place by leaf-springs $i\,i$, which catch under the shoulders formed by the grooves $e'$ on the longitudinal edges of the main part B. This plate C may be removed for cleaning or other purposes by simply disengaging one of the said springs, as shown in dotted lines in Fig. 3. The other plate C' is removably held against the interior of the cover B' by means of a lip or catch *j* and a spring-catch *j'*, both of these catches being secured upon the said cover, as clearly shown in Fig. 4. By simply pressing the spring *j'* back a little the plate C' and its basters may be removed for cleaning, &c. By placing a little water in the pan A the meat may be kept from burning or scorching.

I do not claim anything in this application claimed in my former application above referred to. I do not deem a further description of the operation of this invention necessary in this specification, inasmuch as the same is fully set forth in my former application.

Having thus fully described my invention, what I claim as new, and desire to secure by Letters Patent, is—

1. The combination of a revoluble closed oven provided with sliding sections, the interlocking edges of these two sections forming longitudinal shoulders, a series of removable basters upon the interior of each of the sections, and leaf-springs for removably securing the said two series of basters in place in their respective sections, substantially as set forth.

2. The combination of a two-part closed oven and two groups or series of basters, the basters of each group being secured together and each group being secured removably within the respective sections of the oven, as set forth.

3. In a meat-roaster, the combination of a revoluble oven and basters connected together in a group, such group of basters being removably attached to the interior of the oven, substantially as set forth.

4. The combination, with a two-part revoluble oven, of basters or distributers removably attached to the interior of the respective sections upon opposite sides of the oven, substantially as described.

5. The combination, with a two-part oven, of removable plates secured upon the interior of the oven, these plates being provided with basters, substantially as described.

6. The combination, with an oven, of removable plates secured upon the interior thereof, these plates being corrugated longitudinally to form basting-ribs, substantially as described.

7. The combination, with a two-part revoluble oven, of independent basters or distributers removably secured upon the interior of the said oven, substantially as described.

In testimony whereof I affix my signature in presence of two witnesses.

JAMES W. CARPENTER.

Witnesses:
ROBT. S. GEBHART,
D. W. SCHAEFFER.